No. 752,066. PATENTED FEB. 16, 1904.
J. F. HALE.
OIL SEPARATOR.
APPLICATION FILED APR. 1, 1903.
NO MODEL. 2 SHEETS—SHEET 1.
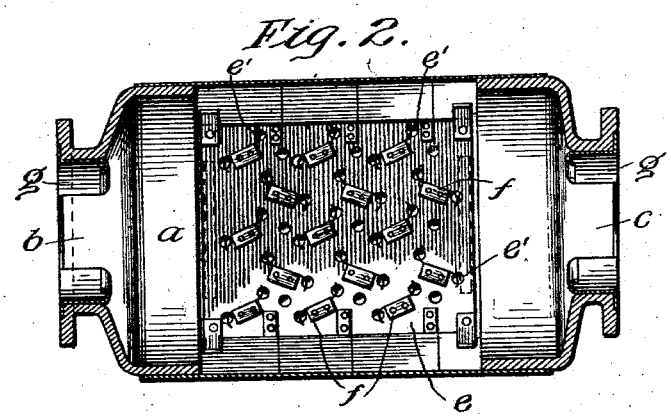
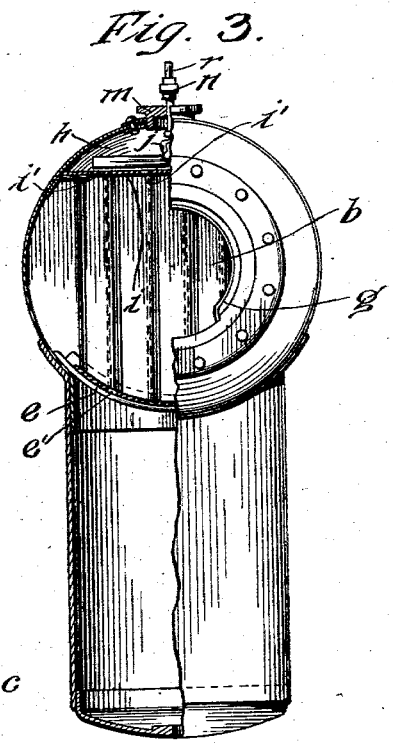
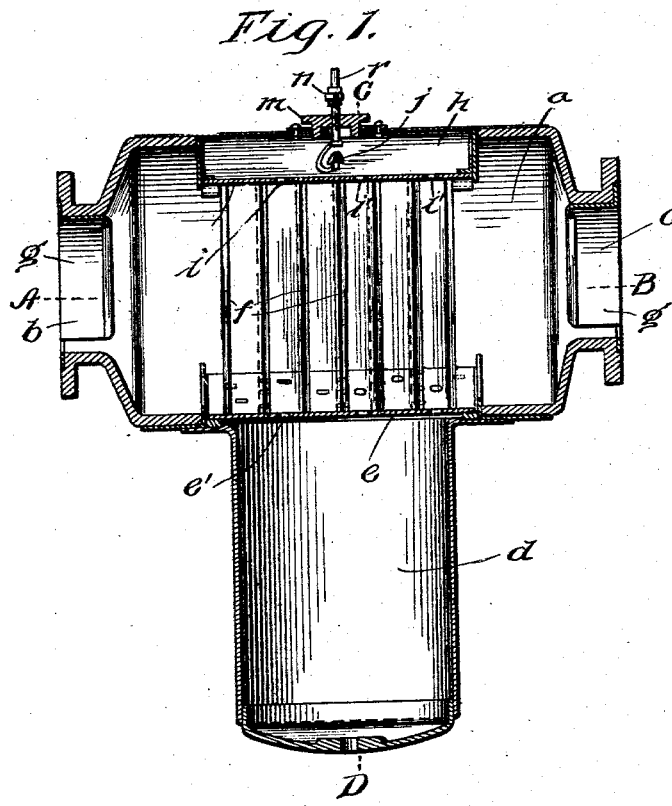
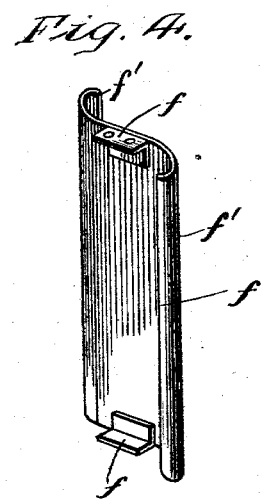
WITNESSES: INVENTOR
F. J. Hartman John F. Hale
R. M. Kelly BY
 ATTORNEY.

No. 752,066. PATENTED FEB. 16, 1904.
J. F. HALE.
OIL SEPARATOR.
APPLICATION FILED APR. 1, 1903.
NO MODEL. 2 SHEETS—SHEET 2.
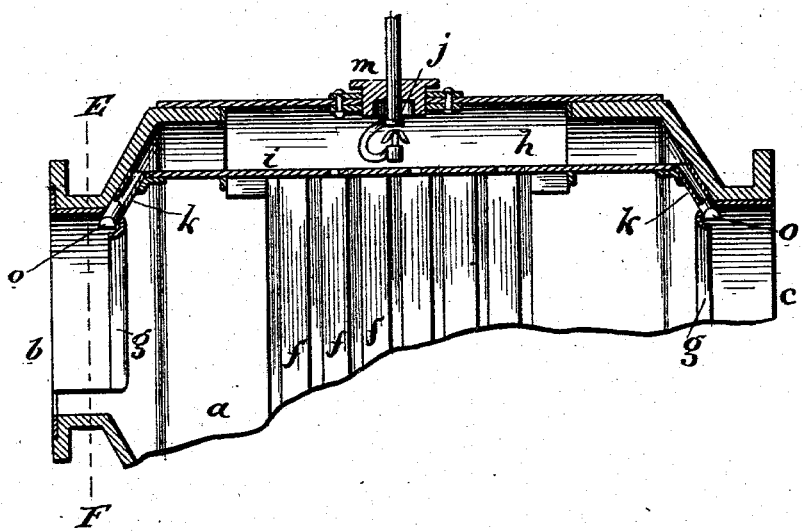
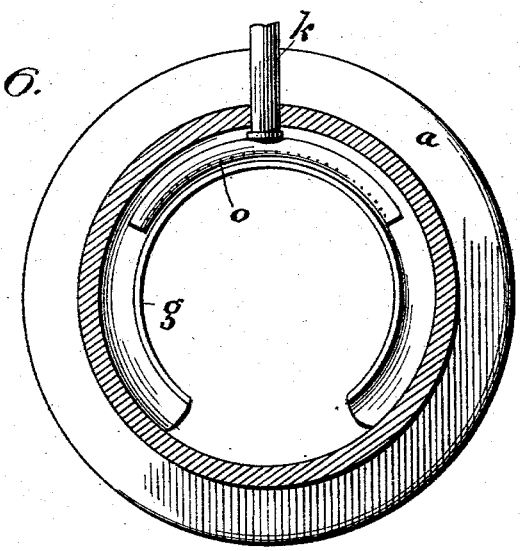

No. 752,066. Patented February 16, 1904.

UNITED STATES PATENT OFFICE.

JOHN F. HALE, OF CHICAGO, ILLINOIS, ASSIGNOR TO WARREN WEBSTER AND COMPANY, A CORPORATION OF NEW JERSEY.

OIL-SEPARATOR.

SPECIFICATION forming part of Letters Patent No. 752,066, dated February 16, 1904.

Application filed April 1, 1903. Serial No. 150,600. (No model.)

*To all whom it may concern:*

Be it known that I, JOHN F. HALE, of the city of Chicago, Cook county, State of Illinois, have invented an Improvement in Oil-Separators, of which the following is a specification.

It is one of the objects of this invention to more effectively and completely accomplish the separation or removal from steam of the oil held in suspension therein.

Owing to the centrifugal motion of the steam under high velocity, a portion of the oil is thrown outward upon the inner walls of the piping, and one of the features of this invention relates to the employment of a baffle at the inlet to collect this oil and discharge it. This baffle is preferably a copper ring having a curved edge extending transversely about the inlet and having an opening at the bottom through which the oil and water may pass into the bottom of the separator or into the receiver. As it is usual to make oil-separators reversible, one of these baffles may be placed at each end, so that either end may act as the inlet.

It is also the object of my invention to render the separator especially adapted to vacuum conditions, and to this end water is supplied to the separator in the form of a shower or spray to assist in condensing the steam as well as in removing the oil. When the water is supplied to the surfaces of the baffles it will render them more efficient in removing and discharging the oil. For this purpose a water-chamber is arranged in the top of the separator, from which the water is supplied through perforations or spray-pipes to the interior of the separator and when supplied to the baffles will form a running film on their surfaces.

The water is preferably supplied by a sprinkler-head, which may be made removable.

In the drawings, Figure 1 is a longitudinal vertical sectional view of an oil-separator embodying the invention. Fig. 2 is a horizontal section of the same on the line A B of Fig. 1. Fig. 3 is an end elevation with one-half in transverse vertical section on the line C D of Fig. 1. Fig. 4 is a perspective view of one of the detached baffle-plates. Fig. 5 is a longitudinal sectional view of part of the separator, showing the water-supply to the end baffles; and Fig. 6 is a vertical sectional view on the line E F of Fig. 5.

The body of the separator $a$ is provided with an inlet $b$ for the steam at one end and an outlet $c$ at the other. The receiving-chamber $d$ is carried by the body $a$ and communicates with the interior thereof, preferably through a perforated plate $e$. Arranged within the separator $a$ between the steam inlet and outlet are a series of baffles $f$, adapted to catch the oil. These baffles may be of any suitable form; but, as shown, they consist of vertical plates having their vertical edges curved, as at $f'$, to catch and retain the oil in the steam. The baffles $f$ are fastened to the perforated base-plate $e$ with the curved vertical edges $f'$ preferably in line with perforations $e'$ in the plate, so that the oil extracted by these curved edges may pass through the perforations into the receiver $d$. The curved edges $f'$ on the plates $f$ are preferably curved in relatively opposite directions, as shown, so that the baffles will be equally effective whether the steam be introduced from one side or the other.

So far as the separator has been described it is of well-known construction and has been described merely for the purpose of illustrating my improvements, which are not, however, restricted to use in connection with separators of this particular construction.

As the steam at the point of entrance is most heavily charged with oil and as this oil is to a great extent deposited on the walls of the piping, I arrange a baffle $g$ directly at the inlet. This baffle, as shown, is substantially annular, and consists of a plate having a curved or hooked edge extending about the inlet, but open at the bottom to allow the oil caught by it to escape into the bottom of the body $a$ and pass into the receiver $d$. As it is desirable that the separator should be reversible, so that either opening $b$ or $c$ may be used as the inlet, a baffle $g$ should be arranged at each end, as shown.

To increase the efficiency of the baffles $f$ in extracting the oil from the steam passing through the chamber $a$, they are kept wet.

For this purpose a chamber $h$ is provided at the top of the body $a$, having a perforated base $i$, the openings $i'$ in which are preferably in line with the curved edges $f'$ of the baffles, so that the water passing through these perforations will form a thin film over the surface of the baffles. The water will flow constantly down the baffles and out through the perforations $e'$ into the receiver $d$, so that the oil extracted by the baffles will be more quickly carried off into the receiver and the accumulation of oil upon the surfaces of the baffles will be prevented. By these means the efficiency of the baffles in extracting the oil will be greatly increased.

My preferred method of supplying the water to the baffles is by means of a sprinkler-head $j$, arranged above the perforated distributing-plate $i$ and receiving the water from a suitable supply-pipe $r$. To enable the sprinkler-head to be removed when desired, it is preferably carried by a removable bushing $m$ in the body $a$ above the plate $i$ and is connected with the supply-pipe $r$ by a suitable coupling $n$.

In the separator shown in Figs. 5 and 6 the water is supplied to the end baffles $g$ also. For this purpose the water-chamber $h$ is shown extended at its ends and provided with water-tubes $k$, terminating in sprinkling-heads $o$, arranged adjacent to the upper portion of the inside of the baffles, by which the water may be thrown in a shower both upon the curved surface of the baffles and across the opening of the separator.

The free shower of water will assist in condensing the steam and render the separator especially adaptable for vacuum conditions. For like reasons the whole or part of the water passing through the perforated base $e$ into the body of the separator may be allowed to fall in a free shower out of contact with the baffles $f$. When, however, the separator is not to be used under vacuum conditions and an increase of condensation is not desired, the water may be supplied only to the surfaces of the baffles $f$ and $g$.

I do not limit myself to the details of construction shown, as they may be varied without departing from the invention.

What I claim as new, and desire to secure by Letters Patent, is as follows:

1. In an oil-separator, the combination with the body having an inlet and an outlet and baffles arranged transversely between said inlet and outlet, of a baffle located at the inlet and consisting of a plate within the inner walls of the inlet and having its inner edge extending in a transverse lip about the inlet.

2. In an oil-separator, the combination with the body having an inlet and an outlet and baffles arranged transversely between said inlet and outlet, of a baffle located at the inlet and consisting of a plate fitted within the inner walls of the inlet and having its inner edge extending in a transverse lip about the inlet but open at the bottom to allow the oil and water caught thereby to escape.

3. In an oil-separator, the combination with the body having an inlet and an outlet and baffles arranged transversely between said inlet and outlet, of a baffle located at the inlet and consisting of a plate fitted within the inner walls of the inlet and having its inner edge extending in a transverse lip about the inlet curved forwardly toward said inlet.

4. In an oil-separator, the combination of a body provided with an inlet and an outlet and having a perforated plate at the top, baffles within said body between said inlet and outlet adjacent to the perforations in said plate, and means to supply water to the surfaces of said baffles through said perforated plate.

5. In an oil-separator, the combination of a body provided with an inlet and an outlet and having perforations in the top and bottom, a receiver communicating with the interior of said body through the perforations in the bottom, baffles between said inlet and outlet arranged adjacent to the perforations in the top and bottom, and means to supply water to the surface of said baffles through the perforations in the top.

6. In an oil-separator, the combination of a body having an inlet and an outlet and provided at the top with a closed water-chamber communicating with the interior of the body through perforations, and at the bottom with a receiver also communicating with the interior of body through perforations, baffles within the body extending from the perforations in the top to those in the bottom, and means to supply water to said water-chamber.

7. In an oil-separator, the combination of a body having an inlet and an outlet and provided at the top with a closed water-chamber communicating with the interior of the body through perforations, and at the bottom with a receiver also communicating with the interior of body through perforations, baffles within the body extending from the perforations in the top to those in the bottom, and a water-sprinkler within said water-chamber to supply water thereto.

8. In an oil-separator, the combination of a body having an inlet and an outlet and provided with a closed water-chamber communicating with the interior of the body through perforations, and at the bottom with a receiver also communicating with the interior of body through perforations, baffles within the body extending from the perforations in the top, a removable plug in said water-chamber, and a water-sprinkler carried by said removable plug and adapted to supply water to said water-chamber.

9. In an oil-separator, the combination of a body having an inlet and an outlet and provided at the top with a closed water-chamber having a perforated base, baffles within the body arranged adjacent to the perforations in said base, a baffle arranged at the inlet, and means to supply water from said water-chamber to said baffle at the inlet.

10. In an oil-separator, the combination of a body having an inlet and an outlet, and provided at the top with a closed water-chamber, a baffle adjacent to the inlet, and a water-tube leading from said chamber and terminating in a spray-pipe adjacent to the upper portion of said baffle.

In testimony of which invention I hereunto set my hand.

JOHN F. HALE.

Witnesses:
   Jas. H. Davis,
   A. J. Simmons.